(12) United States Patent
Yildiz et al.

(10) Patent No.: US 10,085,475 B2
(45) Date of Patent: Oct. 2, 2018

(54) LOW SWELLING STARCH

(71) Applicant: CORN PRODUCTS DEVELOPMENT, INC, Jabaquara, Sao Paulo (BR)

(72) Inventors: Erhan Yildiz, Whitehouse Station, NJ (US); Ralph Trksak, Manville, NJ (US); Yi Yang, Bridgewater, NJ (US); Ron Pagoa, Edison, NJ (US)

(73) Assignee: Corn Products Development, Inc., Bridgewater, NJ (US)

( * ) Notice: Subject to any disclaimer, the term of this patent is extended or adjusted under 35 U.S.C. 154(b) by 0 days.

(21) Appl. No.: 14/676,897

(22) Filed: Apr. 2, 2015

(65) Prior Publication Data

US 2015/0201653 A1 Jul. 23, 2015

Related U.S. Application Data

(62) Division of application No. 12/468,619, filed on May 19, 2009, now abandoned.

(51) Int. Cl.
| | |
|---|---|
| *A23L 29/212* | (2016.01) |
| *C08B 31/00* | (2006.01) |
| *C08B 31/06* | (2006.01) |
| *A23L 29/219* | (2016.01) |

(52) U.S. Cl.
CPC ........... *A23L 29/212* (2016.08); *A23L 29/219* (2016.08); *C08B 31/003* (2013.01); *C08B 31/006* (2013.01); *C08B 31/066* (2013.01)

(58) Field of Classification Search
CPC .................................................. A23L 1/0522
See application file for complete search history.

(56) References Cited

U.S. PATENT DOCUMENTS

| | | | |
|---|---|---|---|
| 4,369,308 | A | 1/1983 | Trubiano |
| 6,299,907 | B1 | 10/2001 | Seib et al. |
| 6,809,197 | B1 | 10/2004 | Woo et al. |
| 2006/0188631 | A1 | 8/2006 | Woo et al. |

FOREIGN PATENT DOCUMENTS

| | | |
|---|---|---|
| EP | 0516107 | 12/1992 |
| EP | 1443057 | 8/2004 |
| WO | 9964508 | 12/1999 |

OTHER PUBLICATIONS

English translation of JP 2005-295821 A, Oct. 27, 2005.
English translation of JP 2006-042739, Feb. 16, 2006.
English translation of JP 11-103757, Apr. 20, 1999.
English translation of JP H07-075479, Mar. 20, 1995.
English translation of JP 2006-129768 A, May 20064.
Richard F. Tester and William R. Morrison, Cereal Chem. 67(6): 551-557, 1990.

*Primary Examiner* — Elizabeth A Gwartney
(74) *Attorney, Agent, or Firm* — Jacqueline Cohen; Jason Grauch

(57) ABSTRACT

This invention pertains to low swelling starches and their use as food texture modifiers. The invention further pertains to the method of using low swelling starches as fat substitutes in foods. The low swelling starches provide opacity, mouth-coating, and creaminess to foods.

4 Claims, 5 Drawing Sheets

Powdery-ness & mouth-coating at different Q at viscosity=1Pa.s (±0.2)

Relationship between reference swelling volume and measured swelling volume (as a function of process conditions) showing that processing conditions have a higher impact on measured swelling volume as swelling volume increases

LOW SWELLING STARCH

This application claims priority to provisional application U.S. Ser. No. 61/073,203 filed 17 Jun. 2008.

FIELD OF THE INVENTION

This invention relates to a low swelling starch and its use as a food texture modifier.

BACKGROUND OF THE INVENTION

Starch products are an important and major component of the diet. Starches are used to provide a multitude of functional aspects to a variety of food products.

One of the most common functional aspects of starch is its ability to thicken foods. In addition, modified starches are widely used to impart tolerance to commercial processing in foods and to ensure shelf stability.

SUMMARY OF THE INVENTION

It has now been discovered that low swelling starches can be used in food products as texture modifiers. Surprisingly, they achieve this texture modifying effect without imparting significant thickness to the food. The low swelling starches provide opacity and mouth-coating to foods while having minimal powdery-ness and minimal thickness. The low swelling starches may be used as fat substitutes. Additionally, the low swelling starches may be used to reduce processing times while delivering the textural aspects described above. Further, the low swelling starches may be used to achieve the same texture under a range of conditions, including high and low solids formulation, high and low shear processing, and high and low pH formulation.

As used herein, the term opacity is intended to mean the lack of transparency of the material as determined visually and is measured by the test outlined in the Examples section.

As used herein, the term mouth-coating is intended to mean the amount of residual coating perceived in the mouth after mastication and swallowing and is measured by the test outlined in the Examples section.

As used herein, the term creaminess is intended to mean that the product has textural characteristics typically imparted by cream; in each food this is inferred from the combined perception of multiple sensory attributes. Including powdery-ness, melt-away, rate of breakdown, opacity, and residual mouth-coating as defined in the Examples section.

As used herein, the term thickness is intended to mean the viscosity of the sample as defined in the Examples section.

As used herein, the term process flexibility is intended to mean that the low swelling starches can be used to achieve the same texture under a range of conditions, including high and low solids formulation, high and low shear processing, and/or high and low pH formulation as defined in the Examples section.

As used herein, fat is intended to include both fat and oil.

As used herein, swelling volume (Q) is intended to mean the total volume occupied by the settled starch granules in a 1% solids cook of starch in a salt solution as defined in the Examples section, test B.

As used herein, granular is intended to mean that the starches have the Intact structure of a native starch granule, but their Maltese cross (under polarized light) is less defined due to compromised crystallinity.

DETAILED DESCRIPTION OF THE INVENTION

Figure 1:
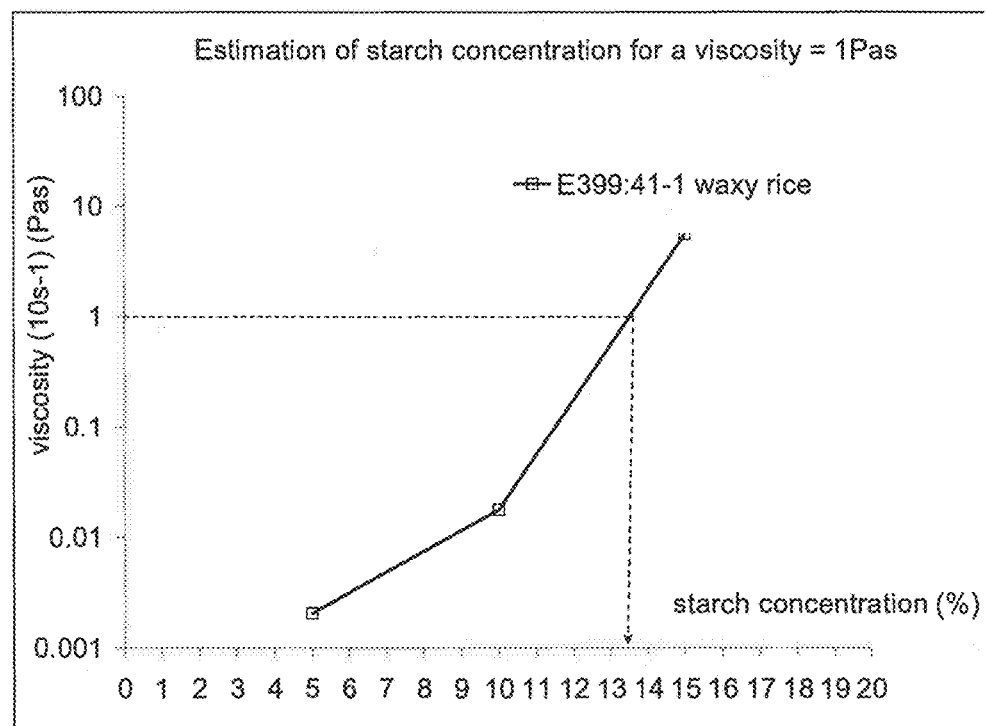
FIG. 1 depicts the starch concentration at a viscosity of 1 Pa·s

This invention pertains to low swelling starches and their use as food texture modifiers. The invention further pertains to the method of using low swelling starches as fat substitutes in foods. The invention further pertains to the method of using low swelling starches to reduce processing times in foods. The Invention further pertains to the method of using low swelling starches to impart superior process flexibility in foods. The low swelling starches provide opacity, mouth-coating, and creaminess to foods. The starch may be made using any starch, such as one found in nature. A native starch as used herein, is one as it is found in nature. Also suitable are starches derived from a plant obtained by standard breeding techniques including crossbreeding, translocation, inversion, transformation or any other method of gene or chromosome engineering to include variations thereof. In addition, starch derived from a plant grown from induced mutations and variations of the above generic starch which may be produced by known standard methods of mutation breeding are also suitable herein.

Typical sources for the starches are cereals, tubers, roots, legumes and fruits. The native source can include corn (maize), pea, potato, sweet potato, banana, barley, wheat, rice, sago, amaranth, tapioca, arrowroot, canna, or sorghum, as well high amylopectin or high amylose varieties thereof. As used herein, the term "high amylopectin" is intended to include a starch containing at least about 90%, particularly at least about 95%, more particularly at least about 98% amylopectin by weight. As used herein, the term "high amylose" is intended to include a starch containing at least about 27% amylose for wheat or rice flour and at least about 50% amylose for other sources, particularly at least about 70%, more particularly at least about 80% amylose by weight. The percent amylose (and therefore amylopectin) is determined by using the potentiometric method set forth in the Examples section.

In order to control the swelling volume of the starch, it is typically inhibited by any method. In one aspect of the invention, inhibition is by thermal inhibition and in a second aspect of the invention, inhibition is by chemical crosslinking. Thermal inhibition is known in the art, and is described for example in WO 95/04082 and WO 96/40794. In one embodiment, the starch is dehydrated to less than 1% moisture and then thermally treated.

Chemical crosslinking is known in the art, for example see *Modified Starches: Properties and Uses*, Ed. Wurzburg, CRC Press, Inc., Florida (1986). In one embodiment, the starch is crosslinked using at least one reagent selected from sodium trimetaphosphate (STMP), a mixture of sodium trimetaphosphate and sodium tripolyphosphate (STPP), phosphorous oxychloride, epichlorohydrin, and adipic-acetic anhydride (1:4) using methods known in the art.

The amount of inhibition, either thermal or chemical through crosslinking, may be varied to get the desired amount of swelling volume which in one embodiment is from about 7 to 12 ml/g, in another embodiment is from 9 to 12 m/g and in a further embodiment is 9 to 10 ml/g, while keeping the fraction of soluble starch to less than 20% wt/wt. The amount of inhibition to obtain a given swelling volume will depend upon a number of factors including the reagent used (if any), the conditions of modification, and the starch used.

In one embodiment, the starch is modified using sodium trimetaphosphate, or a combination of sodium trimetaphosphate and sodium tripolyphosphate. The phosphorylation is conducted using methods known in the art and the amount of modification may be varied to get the desired swelling volume. In one embodiment, the starches are chemically modified by reacting the starch in the presence of water and with the STMP and/or the STPP under conditions of pH and temperature to yield a modified starch. One method of reaction involves initially forming a slurry of the starch in water and adding the crosslinking agent to the slurry. The slurry may be from about 15-60% starch, and in one case from about 30-50% starch, by weight. In one embodiment, reaction conditions include a basic pH of greater than 10.0 and in one case greater than 10.5. In another embodiment, reaction conditions include a pH of from about 10-13 and in one case from about 11-12. The pH may be adjusted, as necessary, during the reaction to maintain it at the desired basic pH levels mentioned. The reaction temperature is from about 25° C. to 70° C., and in one case from about 30° C. to 50° C.

The reaction needs to be carried out only for a sufficient time to provide a sufficient degree of crosslinking to obtain the desired swelling volume, conventionally from about 10 minutes to 24 hours and in one case from about 1-3 hours. In one embodiment, from about 0.1-20% sodium sulfate and/or sodium chloride by weight of the starch is added to the slurry.

The presence of these salts serves to retard gel formation during the reaction and to accelerate the reaction by increasing the base adsorbed by the starch granules.

The starches are crosslinked by phosphorylatlon to form distarch phosphate esters, although mono-substituted phosphate groups may increase as well. In one embodiment, the reaction is conducted so as to favor crosslinking over substitution.

Generally, where a mixture of STMP and STPP is used, it should comprise from about 1-20% by weight STMP and in one case from about 5-16% weight STMP, and from about 0.01-0.2% by weight STPP and in one case from about 0.05-0.16% by weight STPP. The STMP/STPP mixture is advantageously used at a level of from about 1-20% by weight and in one case from about 5-16% by weight, based upon the weight of the starch. Where STMP or STPP is used alone, the above ranges may also be employed.

In another embodiment the starch is crosslinked with phosphorus oxychloride ($POCl_3$) to substantially the same residual phosphorous levels to result in starches with similar swelling volumes.

In yet another embodiment, the crosslinked starch is additionally stabilized by etherification or esterification such as by alkylene oxides e.g., ethylene and propylene oxide, or acetic anhydride, and in a yet further embodiment is stabilized by propylene oxide.

In another embodiment the starch is crosslinked with adipic acetic anhydride reagents to result in starches with similar swelling volumes.

In yet another embodiment the starch is crosslinked with epichlorohydrin to result in starches with similar swelling volumes.

In still yet another embodiment the starch is thermally processed to result in starches with similar swelling volumes.

When the starch is crosslinked by phosphorylation, the resultant starch has a bound phosphorous level due to distarch phosphate crosslinks and mono-substitution) of from about 0.01 to 0.24%. In another embodiment from 0.02-0.10%, and in still another embodiment 0.03 to 0.06%, all by weight of the starch.

In one embodiment, the starch may, n addition to inhibited, be pregelatinized (a precooked, cold-water-swelling starch) using methods known in the art to substantially retain the granular structure and minimize fragmentation. In another embodiment, the inhibited starch may be converted by mild acid degradation, heat dextrinization, alpha-amylase degradation or any one of several methods that are well known in the art. See for example, M. W. Rutenberg. "Starch and Its Modifications" P. 22-36, in Handbook of Water-Soluble Gums and Resins. R. L. Davidson, editor, McGraw Hill. Inc., New York, N.Y., 1980. A combination of one or more of these conversion techniques may be used. These optional methods may be conducted before or after the inhibition step.

The starch may be purified to remove impurities, by-products, off-flavors and colors by methods known in the art such as dialysis, filtration, ion exchange processes, or centrifugation. Such purification may be done on the base starches or the inhibited starches as long as the methodology does not adversely affect the requirements of the starch.

The starch may further be pH adjusted and/or dried using methods known in the art such as drum drying, spray-drying, freeze-drying, flash drying, or air-drying.

In one embodiment, the resultant starches will have an average particle size of from 1 to 10 microns, and in another embodiment will have an average particle size of from 5 to 10 microns. In yet another embodiment the resultant starches will have an average particle size greater than 10 microns. In a further embodiment, the resultant starch will have an average particle size of from 10 to 30 microns. In still yet another embodiment, the resultant starches will have a particle size which does not differ significantly (no more than 10%) from that of the unmodified starch.

The resultant starches will provide opacity, mouth-coating properties and/or creaminess to products. In one embodiment, at least one of these textural properties will be provided without building significant viscosity (less viscosity than that of the unmodified starch which has been cooked out).

The resultant starch may be used to at least partially substitute for the fat typically in a food composition. In one embodiment, the starch is used to replace up to 100%. In another embodiment is used to replace from 25-75%, and in yet another embodiment is used to replace from 40-60% of the fat by weight typically used in the composition.

The starch of this invention may be used in any food or beverage composition (hereinafter collectively referred to as foods). In one embodiment, the food composition is a cultured dairy product such as yogurts, cheeses, and sour creams and in another embodiment Is a dairy product such as puddings and custards. In yet another embodiment, the starch is used in a soup, sauce or gravy such as a tomato soup or cream of mushroom soup, salad dressing, frozen confections such as ice cream, mayonnaise, cream cheese, whipped topping, coffee whiteners, and spreads such as margarines.

The starch may be added at any amount which is acceptable to the consumer from an organoleptic standpoint and in one embodiment is used in an amount of from about 0.1 to 50%, and in another embodiment in an amount of from about 1 to 25%, by weight of the food. The starch may be added as the sole viscosifier or additional viscosifiers may be added, such as gums and starches well known in the art for this purpose.

The resultant starches may also have the added benefit of providing significant viscosity for retorted liquids, such as soups, with reduced processing time. In one embodiment, the reduction of retort time is at least 20%, in another at least 25%, and in a third at least 30% reduction of retort time compared to using conventional retort starches. The resultant starch may be used to at least partially substitute for such conventional retort starches in a food composition. In one embodiment, the starch is used to replace up to 100%, in another embodiment is used to replace from 25-75%, and in yet another embodiment is used to replace from 40-60% of the retort starches by weight used in the composition.

The resultant starches may also have the added benefit of increasing the process tolerance of a food composition, such as a dressing, sauce or gravy. Increased process tolerance is intended to mean that the starches are insensitive to changes in processing due to concentration and viscosity.

EXAMPLES

The following examples are presented to further illustrate and explain the present invention and should not be taken as limiting in any regard. All parts and percentages are given by weight and all temperatures in degrees Celsius (° C.) unless otherwise noted.

The following ingredients were used throughout the examples.

Waxy corn starch, commercially available from National Starch LLC, USA
Waxy rice starch, commercially available from National Starch LLC, USA.
SU2 starch, a specialty waxy corn (maize) starch from a plant which is heterozygous for the recessive sugary-2 allele, as disclosed in U.S. Pat. No. 5,954,883, commercially available from National Starch LLC, USA.
NOVELOSE® 480 HA starch (distarch phosphate, INS No. 1412), commercially available from National Starch LLC, USA.
THERMTEX® starch (hydroxypropyl distarch phosphate: INS No. 1442), commercially available from National Starch LLC. USA.
PURITY® 87 starch (hydroxypropyl distarch phosphate: INS No. 1442), commercially available from National Starch LLC. USA.
NATIONAL 465 starch (hydroxypropyl distarch phosphate: INS No. 1442), commercially available from National Starch LLC, USA.
NATIONAL 1457 starch (hydroxypropyl distarch phosphate: INS No. 1442), commercially available from National Starch LLC. USA.

The following test procedures were used throughout the examples.

A. Amylose Content by Potentiometric Titration 0.5 g of a starch (1.0 g of a ground grain) sample was heated in 10 mls of concentrated calcium chloride (about 30% by weight) to 95° C. for 30 minutes. The sample was cooled to room temperature, diluted with 5 mls of a 2.5% uranyl acetate solution, mixed well, and centrifuged for 5 minutes at 2000 rpm. The sample was then filtered to give a clear solution.

The starch concentration was determined polarimetricaly using a 1 cm polarimetric cell. An aliquot of the sample (normally 5 mls) was then directly titrated with a standardized 0.01 N Iodine solution while recording the potential using a platinum electrode with a KCl reference electrode. The amount of iodine needed to reach the Inflection point was measured directly as bound Iodine. The amount of amylose was calculated by assuming 1.0 gram of amylose will bind with 200 milligrams of iodine.

B. Swelling Volume and Solubles

1. Prepare a 5% starch slurry in 1% NaCl solution in a beaker
2. Cook in a boiling water bath (minimum temperature of 95° C.) for 20 minutes (stir for the first 3 minutes and then cover with a watch glass for the remaining time).
3. Dilute the solution to 1% in a graduated cylinder and allow it to settle for 24 hrs (72 hrs is required for the waxy rice starch, as its smaller particle size slows setting).
4. Record the volume of the settled sample in milliliters
5. Extract an aliquot of the supernatant from the cylinder.
6. Using a hand-held refractometer or a polarimeter, measure the concentration of starch in the supernatant and calculate the % solubles.

C. Rheology

Rheology Methodology:

Each of the samples was tested on the rheometer at 25° C. A sequence of rheology experiments was performed on each sample as described in the table below.

For rheological characterization, an ARES model rheometer (TA instruments, Delaware, N.J.) and AR-G2 model rheometer (TA instruments, Delaware, N.J.) were used. The ARES rheometer is a strain-controlled rheometer and the AR-G2 is a stress-controlled rheometer. Tests can be defined that deliver equivalent data from these two pieces of equipment They were therefore used Interchangeably.

Two geometries were used to test the materials. These are parallel plate and couette (or concentric cylinder) geometries. The results from both types of geometries are equivalent. They were therefore used interchangeably. The geometry dimensions were chosen to meet the requirements for proper rheological testing as defined in textbooks.

| Specific Conditions for ARES | |
|---|---|
| Test | Conditions |
| Dynamic Strain Sweep | $\omega = 1$ rad/s, $\gamma_{min} = 0.1\%$, $\gamma_{max} = 100\%$ |
| Dynamic Frequency Sweep | $\gamma < \gamma_{cr}$, $\omega_{min} = 1$ rad/s, $\omega_{max} = 100$ rad/s |
| Shear Step Rate | Shear rate = $1$ s$^{-1}$, Length of experiment = 120 s |
| Steady Shear Rate Sweep | Shear rate range = 1-100 s$^{-1}$ Delay time at each shear rate set to be greater than the time to reach steady state from the Shear Step Rate |

| Specific Conditions for AR-G2 | |
| --- | --- |
| Test | Conditions |
| Dynamic Strain Sweep | $\omega = 1$ rad/s, $\gamma_{min} = 0.1\%$, $\gamma_{max} = 100\%$ |
| Dynamic Frequency Sweep | $\gamma < \gamma_{cr}$, $\omega_{min} = 1$ rad/s, $\omega_{max} = 100$ rad/s |
| Peak Hold Test | Shear rate = $1$ s$^{-1}$, Length of experiment = 120 s |
| Steady State Flow Step | Shear rate range = 1-100 s$^{-1}$ Steady state is reached when 3 consecutive readings are within 5% of each other or maximum measurement time of 2 minutes, which ever comes first |

In the tables above, "min" refers to minimum, "max" refers to maximum, "$\omega$" refers to frequency. "$\gamma$" refers to strain. "$\gamma_{cr}$" refers to critical strain. "rad" refers to radians, and "s" refers to seconds. The rheological tests, principles, methods, and terms described above are according to standard practice as described in the reference textbooks (Macosko, C., Rheology, Principles, Measurements and Applications, VCH, New York, 1994 (549 pp), Ferry, J. D., Viscoelastic Properties of Polymers, 3rd edition, Wiley, New York. 1980 (641 pp)), Barnes, H. A., Hutton, J. F. and Waiters, K., An Introduction to Rheology, Elsevier, Amsterdam, 1989 (199 pp).

Rheology Attributes:

The viscosity data at 10/s in units of Pa·s was obtained from the steady shear rate sweep on the ARES or the steady state flow step on the AR-G2 ($\eta$ at 10/s).

D. Opacity

Opacity was noted visually on aqueous cooks, cream-of-mushroom soup, and tomato soup. Low swelling samples were simply rated as 'more opaque' or 'less opaque' than the control samples for the aqueous cooks and cream-of-mushroom soup. For tomato soup, the samples were rated as 'more orange' or 'equally red' to the control tomato soup.

E. Retort Time

Retort time data was collected while processing in the retort. The retort time is the time the sample stays in the retort.

F. Sensory Evaluation of Aqueous Cooks

Sensory Methodology:

Descriptive analysis was conducted by nine in-house panelists using Spectrum descriptive methodology as described in standard references (Stone, H., & Sidel, J. L. (2004). Sensory Evaluation Practices (3 rd ed.). San Diego: Academic Press (pp 235-238)). All the panelists were trained on residual mouth-coating and oral powdery-ness attributes and used a sensory universal continuous line scale which ranges from 0 to 15. A total of 38 starch cooks from different bases were evaluated in three sessions. Each panel session was divided into two sub-sessions in which 6 to 7 starch cooks were evaluated. Samples were randomized using a random number generator and accordingly samples were prepared prior to the day of sensory evaluation and stored at refrigerated temperature (32-35° F., 0-2° C.). For each session, all the samples were presented monadically in random order obtained by following a Williams Latin square design generated by Compusense® Five Release 4.8 version. All the samples were evaluated by all the panelists. On the day of evaluation, samples were removed from the refrigerator and brought to room temperature (72° F. 22° C.) before the panelists evaluated. Panelists were thoroughly instructed to cleanse their palates with Poland Spring® water (Poland Spring Water Company, Greenwich, Conn. 06830) and unsalted crackers (NABISCO, Unsalted Tops, Premium, Kraft Foods, North America, East Hanover, N.J. 07936) prior to each sample evaluation. All samples and water were expectorated after tasting. Three minute breaks were taken between each sample evaluation and 45 minute breaks were taken after 6 th sample evaluation in a given session. After completing sensory panel evaluations, sample attribute mean scores were calculated by averaging the responses from the panelists using XLSTAT version 2008.3.02. The following attributes were used in the descriptive evaluation of the samples.

Sensory Attributes:

The attributes that were evaluated are defined below.

Oral Powdery-ness:

Definition: The amount of very fine powdery particles perceived in the sample

Technique: Take a large spoonful of product and evaluate for very fine powdery particles during the manipulation between tongue and palate References: On the 15-point line scale, the following materials were used as references:

Yoplait Yogurt Smoothie (2);

Chewed Raw Potato (8);

Unheated PURITY® 87 starch (6%) (13)

Residual Mouth-coating:

Definition: The amount of residue left on the mouth surfaces after swallowing

Technique: Take a spoonful of product, manipulate between tongue and palate for 3 compressions and then expectorate the sample References: On the 15-point line scale, the following materials were used as references:

Whole Milk (2.7);

Tuscan Heavy Cream (7);

Jell-O Pudding (9);

Skippy Peanut Butter (15)

G. Sensory Evaluations of Cream-of-Mushroom Soup—Kettle

Sensory Methodology:

Descriptive analysis was conducted by 8-10 in-house panelists using Spectrum descriptive methodology (Stone, H., & Sidel, J. L. (2004). Sensory Evaluation Practices (3 rd ed.). San Diego: Academic Press (pp 235-238)). All the panelists were trained on the sensory textural attributes and used a sensory universal continuous line scale which ranges from 0 to 15. A total of 24 cream-of-mushroom soups prepared using a kettle containing different starches and starch-hydrocolloid blends were evaluated in three sessions. Each panel session was divided into two sub sessions in which 4 cream-of-mushroom soups were evaluated. Samples were randomized using a random number generator and accordingly samples were prepared prior to the day of sensory evaluation and stored at refrigerated temperature (32-35° F., 0-2° C.). For each session, all the samples were presented monadically in random order obtained by following a Williams Latin square design generated by Compusense® Five Release 4.8 version. On the day of evaluation, samples were removed from the refrigerator and heated to 165° F. (74° C.) and maintained at this temperature using a steam bath throughout the evaluation period. Panelists were instructed to evaluate the samples between 135° F. to 145° F. (57-63° C.) and panelists monitored the sample temperature using a digital thermometer during the evaluation period. All the samples were labeled with three digit random codes. Panelists were thoroughly instructed to cleanse their palates with Poland Spring® water (Poland Spring Water Company, Greenwich, Conn. 06830) and unsalted crackers (NABISCO, Unsalted Tops, Premium, Kraft Foods, North America, East Hanover, N.J. 07936) prior to each sample evaluation. All samples and water were expectorated after tasting. Three minute breaks were taken between each sample evaluation and 45 minute breaks were taken after the 8th sample evaluation in a given session. After completing sensory panel evaluations, sample attribute mean scores were calculated by averaging the responses from the panelists using XLSTAT version 2008.3.02. The following attributes were used in the descriptive evaluation of the soup samples Sensory Attributes:

The attributes that were evaluated are defined below.

Powdery-ness:

Definition: The amount of very fine powdery particles perceived in the sample.

Technique: Take a large spoonful of product and evaluate for very fine powdery particles during the manipulation between tongue and palate.

References: The following references were used on the 15-point line scale:
Yoplait® Yogurt Smoothie (2).
Chewed Raw Potato (8), and
Unheated starch (PURITY$^e$ 87 starch @6.6%) (13).

Rate of Breakdown:

Definition: The rate at which sample thins out.

Technique: Take a large spoonful of product, manipulate 2-4 times.

References: The following references were used on the 15-point line scale:
Yoplait® Yogurt Smoothie (3), and
Apricot Nectar (7).

Residual Mouth-coating (after Product is Swallowed or Expectorated):

Definition: The amount of residue left on the mouth surfaces after swallowing.

Technique: Take a large spoonful of product, manipulate between tongue and palate for 2-4 times, and then expectorate.

References: The following references were used on the 15-point line scale:
Whole Milk (2.7), and
Tuscan Heavy Cream (7).

H. Sensory Evaluations of Cream-of-Mushroom Soup—Retort

Sensory Methodology:

Descriptive analysis was conducted by 8-10 in-house panelists using Spectrum descriptive methodology (Stone H., & Sidel J., 2004). All the panelists were trained on the sensory textural attributes and used a sensory universal continuous line scale which ranges from 0 to 15. A total of 26 cream of mushroom samples prepared by retort process using different starches and starch-hydrocolloid blends were evaluated in three sessions. Each panel session was divided into two sub sessions in which 4 cream of mushroom soups were evaluated. Samples were randomized using a random number generator and accordingly samples were prepared 10 days prior to the day of sensory evaluation and stored at refrigerated temperature (32-35° F., 0-2° C.). For each session, all the samples were presented monadically in random order obtained by following a Williams Latin square design generated by Compusense® Five Release 4.8 version. On the day of evaluation, samples were removed from the refrigerator and heated to 165° F.•74° C.) and maintained at this temperature using a steam bath throughout the evaluation period. Panelists were instructed to evaluate the samples between 135° F. to 145° F. (57-63° C.) and panelists monitored the sample temperature using a digital thermometer during the evaluation period. All the samples were labeled with three digit random codes. Panelists were thoroughly instructed to cleanse their palates with Poland Spring® water (Poland Spring Water Company, Greenwich, Conn. 06830) and unsalted crackers (NABISCO®, Unsalted Tops, Premium, Kraft Foods, North America, East Hanover, N.J. 07936) prior to each sample evaluation. All samples and water were expectorated after tasting. Three minute breaks were taken between each sample evaluation and 45 minute breaks were taken after 8 th sample evaluation in a given session. After completing sensory panel evaluations, sample attribute mean scores were calculated by averaging the responses from the panelists using XLSTAT version 2008.3.02.

Sensory Attributes:

The attributes that were evaluated are defined in section G above.

I. Sensory Evaluations of Tomato Soup—Kettle

Sensory Methodology:

Descriptive analysis was conducted by 8-10 in-house panelists using Spectrum descriptive methodology (Stone H & Sidel J., 2004). All the panelists were trained on the sensory textural attributes and used a sensory universal continuous line scale which ranges from 0 to 15. A total of 24 tomato soup samples prepared by kettle using different starches and starch-hydrocolloid blends were evaluated in three sessions. Each panel session was divided into two sub-sessions in which 4 tomato soups were evaluated. Samples were randomized using a random number generator and accordingly samples were prepared prior to the day of sensory evaluation and stored at refrigerated temperature (32-35° F., 0-2° C.). For each session, all the samples were presented monadically in random order obtained by following a Williams Latin square design generated by Compusense® Five Release 4.8 version. On the day of evaluation, samples were removed from the refrigerator and heated to 165° F. (74° C.) and maintained at this temperature using a steam bath throughout the evaluation period. Panelists were instructed to evaluate the samples between 135° F. to 145° F. (57-63° C.) and panelists monitored the sample temperature using a digital thermometer during the evaluation period. All the samples were labeled with three digit random codes. Panelists were thoroughly instructed to cleanse their palates with Poland Spring® water (Poland Spring Water Company, Greenwich, Conn. 06830) and unsalted crackers (NABISCO, Unsalted Tops, Premium, Kraft Foods, North America, East Hanover, N.J. 07936) prior to each sample evaluation. All samples and water were expectorated after tasting. Three minute breaks were taken between each sample evaluation and 45 minute breaks were taken after the 8th sample evaluation in a given session. After completing sensory panel evaluations, sample attribute mean scores were calculated by averaging the responses from the panelists using XLSTAT version 2008.3.02. The following attributes were used in the descriptive evaluation of the soup samples Sensory Attributes:

The attributes that were evaluated are defined in section G above.

J. Sensory Evaluations of Tomato Soup—Retort

Sensory Methodology:

Descriptive analysis was conducted by 8-10 in-house panelists using Spectrum descriptive methodology (Stone H., & Sidel J., 2004). All the panelists were trained on the sensory textural attributes and used a sensory universal continuous line scale which ranges from 0 to 15. A total of 26 tomato soup samples prepared by retort process using different starches and starch-hydrocolloid blends were evaluated in three sessions. Each panel session was divided into two sub sessions in which 4 tomato soups were evaluated. Samples were randomized using a random number generator and accordingly samples were prepared 10 days prior to the day of sensory evaluation and stored at refrigerated temperature (32-35° F., 0-2° C.). For each session, all the samples were presented monadically in random order obtained by following a Williams Latin square design generated by Compusense® Five Release 4.8 version. On the day of evaluation, samples were removed from the refrigerator and heated to 165° F. (74° C.) and maintained at this temperature using a steam bath throughout the evaluation period. Panelists were instructed to evaluate the samples between 135° F. to 145° F. (57-63° C.) and panelists monitored the sample temperature using a digital thermometer during the evaluation period. All the samples were labeled with three digit random codes. Panelists were thoroughly instructed to cleanse their palates with Poland Spring® water (Poland Spring Water Company, Greenwich, Conn. 06830) and unsalted crackers (NABISCO®, Unsalted Tops, Premium. Kraft Foods, North America, East Hanover, N.J. 07936) prior to each sample evaluation. All samples and water were expectorated after tasting. Three minute breaks were taken between each sample evaluation and 45 minute breaks were taken after 8 th sample evaluation in a given session. After completing sensory panel evaluations, sample attribute mean scores were calculated by averaging the responses from the panelists using XLSTAT version 2008.3.02. The following attributes were used in the descriptive evaluation of the soup samples Sensory Attributes:
The attributes that were evaluated are defined in section G above.

K. Sensory Evaluation of Pudding
Sensory Methodology:
Descriptive analysis was conducted by nine in-house panelists using Spectrum descriptive methodology (Stone H & Sidel J., 2004). All the panelists were trained on the sensory textural attributes and used a sensory universal continuous line scale which ranges from 0 to 15. A total of 34 pudding samples prepared using different starches and starch-hydrocolloid blends were evaluated in four sessions. Each panel session was divided into two sub-sessions in which 4 samples were evaluated. Samples were randomized using a random number generator and accordingly samples were prepared one week prior to the day of sensory evaluation and stored at refrigerated temperature (32-35° F., 0-2° C.). For each session, all the samples were presented monadically in random order obtained by following a Williams Latin square design generated by Compusense® Five Release 4.8 version. All the samples were evaluated by all the panelists. On the day of evaluation, samples were removed from the refrigerator and Immediately used for evaluations. Panelists were thoroughly instructed to cleanse their palates with Poland Spring) water (Poland Spring Water Company, Greenwich, Conn. 06830) and unsalted crackers (NABISCO®, Unsalted Tops, Premium, Kraft Foods, North America, East Hanover, N.J. 07936) prior to each sample evaluation. Ak samples and water were expectorated after tasting. Three minute breaks ware taken between each sample evaluation and 45 minute breaks were taken after 6th sample evaluation in a given session. After completing sensory panel evaluations, sample attribute mean scores were calculated by averaging the responses from the panelists using XLSTAT version 2008.3.02. The following attributes were used in the descriptive evaluation of the pudding samples.

Sensory Attributes:
The attributes that ware evaluated are defined below.

Surface Grain in Container:
Definition: The amount of particles which can be seen in the surface of the product prior to stirring.
Technique: Evaluate the amount of grain on the surface of the product by tilting the container against the light. Please judge only the continuous surface of the product.
References: The following references were used on the 15-point line scale:
Dannon Plain Yogurt (stirred 10x) (5).

Spoon Indentation:
Definition: The indentation made by spoon in the sample before stirring.
Technique: Scoop out ONE spoonful of product from the middle ⅓ down into the cup with a big spoon, raise it vertically, and evaluate the cross section for clarity/definition. Use Large Spoon.
References: The following references were used on the 15-point line scale:
Original La Yogurt (2),
Plain Dannon (13), and
Jello (15).

Jiggle:
Definition: The gelatin-like appearance of the product on the spoon before stirring.
Technique: Scoop a heaping spoonful of product and shake slightly with trembling motion. Use Large Spoon.
References: The following references were used on the 15-point line scale:
Original La Yogurt (1).
Jello Pudding (6.5), and
Jell-O (15).

Surface Grain on SPOON:
Definition: The amount of particles which can be seen on the surface of the product when viewed on the back of a spoon after stirring.
Technique: Coat spoon with the product, remove spoon from container, and evaluate the back of the spoon for presence of visible particles. Use Large Spoon.
References: The following references were used on the 15-point line scale:
Swiss Miss Pudding (2)
Skippy Peanut Butter (9)
Note: Please do not stir references Firmness Before Stir:
Description: The force required to compress the product before stirring.
Technique: Take a spoonful of product, manipulate between tongue and palate for 1 compression. Use Small Spoon.
References: The following references were used on the 15-point line scale:
Redi Whip® (3),
Jell-O® Pudding (5),
Cheese Whiz® (8).
Skippy® Peanut Butter (10), and
Cream Cheese (14).

Viscosity Off SPOON:
Description: How fast the material flows off the spoon after stirring.
Technique: Rate the flow off the spoon when tilted. Use Large Spoon.

References: The following references were used on the 15-point line scale:
Smuckers® Fudge (0),
Condensed Milk (5),
Hershey's® Chocolate Syrup (8), and
Water (15).

Firmness after Stir:
Definition: The force required to compress the product after stirring.
Technique: Take a spoonful of product, manipulate between tongue and palate for 1 compression. Use Small Spoon.
References: The following references were used on the 15-point line scale:
Redi Whip® (3),
Jell-O® Pudding (5),
Cheese Whiz® (8),
Skippy® Peanut Butter (10), and
Cream Cheese (14).

Cohesiveness:
Definition: The amount of deformation/stringing rather than sheer/cut or rupture after stir.
Technique: Take a spoonful of product and place on tongue; compress once between tongue and palate.
References: The following references were used on the 15-point line scale:
Gelatin Dessert (1),
Redi Whip® (3),
Instant Pudding (5),
Babyfood (8), and
Tapioca Pudding(13).

Evenness of Mouth-Coating:
Definition: Extent to which sample evenly spreads over the palate during manipulation after stir.
Technique: Place large spoon full of product in mouth and evaluate for evenness of spread during manipulation between tongue and palate.
References: The following references were used on the 15-point line scale:
Gelatin Jell-O® (0),
Chocolate Syrup (4).
Condensed Milk (8), and
Ranch Dressing (13).

Slipperiness:
Definition: Ease to slide tongue over product after stirring.
Technique: Take a large spoonful of product and place on tongue; hold the product on tongue by cupping your tongue and holding your teeth slightly ajar; hold product away from palate, move tongue underneath of product back and forth.
References: The following references were used on the 15-point line scale:
Baby Food Peas (3.5),
Plain Dannon® (7.5).
Sour Cream (11.0), and
Salad Dressing (12.0).

Melt-Away:
Definition: The rate at which a sample dissolves or melts in the mouth.
Technique: Take a spoonful of product, manipulate between tongue and palate for 5 compressions/manipulations. Use Small Spoon.
References: The following references were used on the 15-point line scale:
Peanut Butter (2.5),
Whipped Cream Cheese (6.5), and
Jell-O® Pudding (10.5).

Residual: After Product is Swallow or Expectorated

Residual Mouth-Coating:
Definition: The amount of residue left on the mouth surfaces after swallowing.
Technique: Take a spoonful of product, manipulate between tongue and palate for 3 compressions and then swallow. Use Small Spoon.
References: The following references were used on the 15-point line scale:
Whole Milk (2.7),
Heavy Cream (7),
Jell-O® Pudding (9), and
Skippy® Peanut Butter (15).

EXAMPLE 1

Preparation of Crosslinked Starches

Low swelling starches were prepared as described below. Different reaction batch sizes were produced. The reactions sizes captured in the following descriptions are representative a. E399-38-4, E399-37, E399-33, E399-26, E398:68: Waxy rice starch (1000 gm, dry basis), water (2000 mL), STMP (sodium trimetaphosphate, 14.85 gm, 1.485%, based on dry starch), sodium tripolyphosphate (STPP, 0.15 gm, 0.015% on dry starch) and sodium sulfate (200 gm, 20% based on dry starch) were combined. Using a 3% sodium hydroxide solution, the alkalinity of the slurry was adjusted to 50 mL (that is, 50 mL of 0.1N HCl was required to neutralize the alkali in a 50 mL slurry sample). This resulted in a pH of 11.5. The temperature of the slurry was adjusted to 42-45° C. The pH was then maintained at the starting pH of 11.5 during the entire 24 hours of the reaction with a pH controller (Barnant Digital pH Controller Model No. 501-3400) that controlled a peristaltic pump that added a 3% NaOH solution to maintain the pH at the set point b. E399:53: SU2 starch (1000 gm, dry basis), water (2000 mL), STMP (sodium trimetaphosphate, 14.85 gm, 1.485%, based on dry starch), sodium tripolyphosphate (STPP, 0.15 gm, 0.015% on dry starch) and sodium sulfate (50 gm, 5% based on dry starch) were combined. Using a 3% sodium hydroxide solution, the alkalinity of each slurry was adjusted to 50 mL (that is, 50 mL of 0.1N HCl was required to neutralize the alkali in a 50 mL slurry sample). This resulted in a pH of 11.5. The temperature of the slurry was adjusted to 42-45° C. The pH was then maintained at the starting pH of 11.5 during the entire 24 hours of the reaction with a pH controller (Barnant Digital pH Controller Model No. 501-3400) that controlled a peristaltic pump that added a 3% NaOH solution to maintain the pH at the set point.

c. E399:48-1, E399:48-3, E399:41-1, E399:41-2, E399:38-1, E399:48-3: Additional samples were made using the above procedures, but varying the amount of STMP and STPP used to crosslink the starch to vary the final swelling volume obtained.

The swelling volume of each sample was tested using the methodology described in this Examples section. The results are summarized below.

Starch Preparation and Characterization

| Starch Base | Sulfate (%) | STMP (%) | STPP (%) | Swelling Volume (ml/g) |
|---|---|---|---|---|
| E398:68 (waxy rice starch) | 20 | 1.485 | 0.015 | 8.0 |
| E399:26 (waxy rice starch) | 20 | 1.485 | 0.015 | 9.0 |
| E399:33 (waxy rice starch) | 20 | 1.485 | 0.015 | 9.5 |
| E399:37 (waxy rice starch) | 20 | 1.485 | 0.015 | 10.0 |
| E399:38-1 (waxy rice starch) | 20 | 0.0495 | 0.0005 | 22.0 |
| E399:38-4 (waxy rice starch) | 20 | 1.485 | 0.015 | 9.0 |
| E399:41-1 (waxy rice starch) | 20 | 2.475 | 0.025 | 7.0 |
| E399:41-2 (waxy rice starch) | 20 | 7.920 | 0.080 | 4.0 |
| E399:48-1 (SU2 starch) | 5 | 0.495 | 0.005 | 14.7 |
| E399:53 (SU2 starch) | 5 | 1.485 | 0.015 | 8.5 |
| E399:48-3 (SU2 starch) | 5 | 7.920 | 0.080 | 5.0 |

EXAMPLE 2

Evaluation of Low Swelling Starch in Cream-of-Mushroom Soup

Low swelling starches were evaluated in cream-of-mushroom soup under kettle processing conditions and under retort processing conditions. The results under both conditions are described below.

a. KETTLE Conditions

The formulation used for cream-of-mushroom soup is shown in the table below.

Cream-of-Mushroom Soup Formulation - Kettle

| | AMOUNT (% w/w) | |
|---|---|---|
| Ingredients | Experimental | Control |
| Water | 73.11 | 79.61 |
| Heavy Cream 36% fat | 15.00 | 15.00 |
| Mushrooms | 0.00 | 0.00 |
| Starch A[1] | — | 3.50 |
| Starch B[2] | 10.00 | — |
| Sugar | 0.70 | 0.70 |
| Salt | 0.70 | 0.70 |
| Onion Powder[3] | 0.25 | 0.25 |
| Mono & Diglycerides[4] | 0.20 | 0.20 |
| White Pepper[5] | 0.04 | 0.04 |

[1]NATIONAL 465 ® starch, commercially available from National Starch
[2]Low Swelling Starch - E399:33
[3]Commercially available from McCormick
[4]Myvacet 945-K from Kerry Bioscience
[5]Commercially available from McCormick The dry ingredients (sugar, salt, onion powder, white pepper, and starch) were blended thoroughly. The blend was added to the water and heavy cream in a stainless steel beaker using a whisk to incorporate thoroughly. The mono- and di-glycerides were then added to this mix using a pipette. This mixture was then transferred into the Thermomix kettle. The mix was cooked at 200° F. (93° C.) at Shear 1 for 45 minutes. After the cooking, the mix was poured back into stainless steel beakers, cooled slightly and placed into the refrigerator until evaluation.

The cream-of-mushroom soups were evaluated. Both soups were reheated to a serving temperature between 120° F.-130° F. (49-54° C.). It was observed that the key difference between the experimental starch and the control starch was that the experimental starch provided significantly increased residual mouth-coating while maintaining low powdery-ness at equivalent viscosity to the control. This imparted a desirable creaminess to the soup.

Viscosity and sensory data was collected on the soups as described in the Examples. The viscosity and sensory data is summarized as follows.

Experimental Results - Cream-of-Mushroom Soup - Kettle

| Attribute | Experimental | Control |
|---|---|---|
| Viscosity [Pa · s] | 1.28 | 0.70 |
| Powdery-ness | 7.50 | 10.96 |
| Rate of Breakdown | 2.40 | 4.70 |
| Residual Mouth-coating | 6.93 | 3.66 | b. RETORT Conditions

The formulation use for cream-of-mushroom soup is shown in the table below.

Cream-of-Mushroom Soup Formulation - Retort

| | AMOUNT (% w/w) | |
|---|---|---|
| Ingredients | Experimental | Control |
| Water | 73.11 | 79.61 |
| Heavy Cream 36% fat | 15.00 | 15.00 |
| Mushrooms | 0.00 | 0.00 |
| Starch A[1] | — | 3.50 |
| Starch B[2] | 10.00 | — |
| Sugar | 0.70 | 0.70 |
| Salt | 0.70 | 0.70 |
| Onion Powder[3] | 0.25 | 0.25 |
| Mono & Diglycerides[4] | 0.20 | 0.20 |
| White Pepper[5] | 0.04 | 0.04 |

[1]NATIONAL 465 starch - starch commercially available from National Starch
[2]Low Swelling Starch - E399:26
[3]Commercially available from McCormick
[4]Myvacet 945-K from Kerry Bioscience
[5]Commercially available from McCormick The dry ingredients (sugar, salt, onion powder, white pepper, and starch) were blended thoroughly in a Ziploc bag. Into a clean container, the water, heavy cream and mono- and di-glycerides were added. The container was placed under a Baldor industrial high shear mixer. The mixer was turned on to create a vortex. The dry blend was added to the vortex to incorporate thoroughly (about 3 minutes). This mixture was then transferred into a Groen kettle. This mix was heated to about 190° F. (88° C.) for 10 minutes under constant agitation. When the batch was ready, 3 retort probe cans were filled according to the specified weight and headspace as determined by the process authority. The rest of the mixture was filled into the product cans and sealed. The product cans were filled 3 grams less than the probe cans. Cans were then transferred into the retort and processed accordingly to achieve an $F_o=10$. Retort temperature was at 250° F. (121° C.) and agitation at 12 rpm. After the retort process, product cans were held at the retort facility for an incubation period of 10 days before release and evaluation.

The cream-of-mushroom soups were evaluated. Product cans were opened and the contents poured into stainless steel beakers. Both soups were reheated to a serving temperature between 120° F.-130° F. (49-54° C.). It was observed that the key difference between the experimental starch and the control starch was that the experimental starch provided significantly lower powdery-ness and higher residual mouth-coating even though it had lower viscosity than the control. This imparted a desirable increased creaminess to the soup.

Viscosity and sensory data was collected on the soups as described in the Examples. The viscosity and sensory data is summarized as follows.

Experimental Results - Cream-of-Mushroom Soup - Retort

| Attribute | Experimental | Control |
|---|---|---|
| Viscosity [Pa · s] | 0.44 | 1.02 |
| Powdery-ness | 9.99 | 11.16 |
| Rate of Breakdown | 4.50 | 5.4 |
| Residual Mouth-coating | 6.11 | 4.22 |

Viscosity and sensory data was collected on the soups as described in the Examples. The viscosity and sensory data is summarized as follows.

Experimental Results - Tomato Soup - Kettle

| Attribute | Experimental | Control |
|---|---|---|
| Viscosity [Pa · s] | 0.38 | 0.43 |
| Opacity | More orange | Red |
| Powdery-ness | 10.16 | 10.57 |
| Rate of Breakdown | 3.85 | 5.22 |
| Residual Mouth-coating | 4.84 | 4.25 | b. RETORT Conditions

The formulation use for tomato soup is shown in the table below.

Tomato Soup Formulation - Retort

| | AMOUNT (% w/w) | |
|---|---|---|
| Ingredients | Experimental | Control |
| Water | 73.90 | 76.40 |
| Tomato Paste[1] | 13.30 | 13.30 |
| High Fructose Corn Syrup 42[2] | 6.60 | 6.60 |
| Starch C[3] | — | 2.50 |
| Starch B[4] | 5.00 | — |
| Salt | 1.20 | 1.20 |

[1]commercially available from Contadina
[2]commercially available from Golden Barrel Baking Products
[3]THERMTEX ® starch, commercially available from National Starch
[4]Low Swelling Starch E398:68

The dry Ingredients (salt and starch) were blended thoroughly in a Ziploc bag. Into a clean container, the water, tomato paste and high fructose corn syrup were added. The container was placed under a Baldor industrial high shear mixer. The mixer was turned on to create a vortex. The dry blend was added to the vortex to incorporate thoroughly (about 3 minutes). This mixture was then transferred into a Groen kettle. This mix was heated to about 190° F. (88° C.) for 10 minutes under constant agitation. When the batch was ready, 3 retort probe cans were filled according to the specified weight and headspace as determined by the process authority. The rest of the mixture was filled into the product cans and sealed. The product cans were filled 3 grams less than the probe cans. Cans were then transferred into the retort and processed accordingly to achieve an $F_o$=10, a retort temperature at

EXAMPLE 3

Evaluation of Low Swelling Starch in Tomato Soup

Low swelling starches were evaluated in tomato soup under kettle processing conditions and under retort processing conditions. The results under both conditions are described below.

a. KETTLE Conditions

The formulation use for tomato soup is shown in the table below.

Tomato Soup Formulation - Kettle

| | AMOUNT (% w/w) | |
|---|---|---|
| Ingredients | Experimental | Control |
| Water | 73.90 | 76.40 |
| Tomato Paste[1] | 13.30 | 13.30 |
| High Fructose Corn Syrup 42[2] | 6.60 | 6.60 |
| Starch C[3] | — | 2.50 |
| Starch B[4] | 5.00 | — |
| Salt | 1.20 | 1.20 |

[1]Commercially available from Contadina
[2]Commercially available from Golden Barrel Baking Products
[3]THERMTEX ® starch, commercially available from National Starch
[4]Low Swelling Starch - E399:33

The dry ingredients (salt, and starch) were blended thoroughly. The blend was added to the water, tomato paste and high fructose corn syrup in a stainless steel beaker using a whisk to incorporate thoroughly. This mixture was then transferred into the Thermomix kettle. The mix was cooked at 200° F. (93° C.) at Shear 1 for 40 minutes. After the cooking, the mix was poured back into stainless steel beakers, cooled slightly and placed into the refrigerator until evaluation.

The tomato soups were evaluated. Both soups were reheated to a serving temperature between 120° F.-130° F. (49-54° C.). The control soup had a reddish color typical of a tomato soup. The experimental soup had an orange color more typical of a creamy tomato soup. Both soups had similar viscosity, powdery-ness and residual mouth-coating. The experimental soup had a delayed rate of breakdown compared to the control, typical of fat containing foods. The key difference between the experimental starch and the control starch was that the experimental starch provided significant opacity to the tomato soup that changed the color and imparted a desirable creamy tomato soup appearance even thought the formulation contained no cream.

210° F. (99° C.) while being agitated at 12 rpm. After the retort process, product cans were held at the retort facility for an incubation period of 10 days before release and evaluation.

The tomato soups were evaluated. Product cans were opened and the contents poured into stainless steel beakers. Both soups were reheated to a serving temperature between 120° F.-130° F. (49-54° C.). The control soup had a dark reddish color typical of a tomato soup. The experimental soup had an orange color more typical of a creamy tomato soup. Both soups had similar rate of breakdown and residual mouth-coating. The experimental soup had higher viscosity and powdery-ness compared to the control. The key difference between the experimental starch and the control starch was that the experimental starch provided significant opacity to the tomato soup that changed the color and imparted a desirable creamy tomato soup appearance even thought the formulation contained no cream.

Viscosity and sensory data was collected on the soups as described in the Examples. The viscosity and sensory data is summarized as follows.

| Experimental Results - Tomato Soup - Retort | | |
|---|---|---|
| Attribute | Experimental | Control |
| Viscosity [Pa · s] | 0.32 | 0.07 |
| Opacity | More orange | Red |
| Powdery-ness | 11.0 | 9.70 |
| Rate of Breakdown | 4.08 | 4.50 |
| Residual Mouth-coating | 4.55 | 4.16 |

EXAMPLE 4

Evaluation of Low Swelling Starch in Pudding

The formulation use for pudding is shown in the table below.

| Pudding Formulation | | |
|---|---|---|
| | Amount (% w/w) | |
| INGREDIENTS | Experimental | Control |
| Starch A | 3.68 | 5.00 |
| Starch B | 3.68 | 0.00 |
| Sugar | 10.00 | 10.00 |
| Skim Milk | 82.64 | 84.38 |
| TOTAL | 100.00 | 100.00 |

Starch A: NATIONAL 1457 starch - commercially available from National Starch
Starch B: Low Swelling Starch - E399:37

The dry Ingredients Starch A, Starch B and sugar were blended well. The blended dry ingredients were added to skim milk under medium agitation and made into a slurry. The slurry was transferred in to a Groen kettle covered with aluminum foil and heated up to 200° F. (93° C.) with agitation at 25 rpm. The temperature was held at 200° F.±3° F. (93° C.±1° C.) for 25 minutes; after the holding the pudding was cooled for 5 minutes and cups were filled to 135 to 145° F. (57-63° C.), then chilled over ice and refrigerated at 40° F. (4° C.).

The sample was compared to the control. The experimental sample and control both had similar viscosity, spoon indentation, surface grain (before stir), jiggle, surface grain on spoon, firmness before stir, viscosity off spoon, cohesiveness, evenness of mouth-coating, and slipperiness. The experimental sample had greater residual mouth-coating and firmness after stir and delayed melt-away compared to the control. The key difference between the experimental starch and the control starch was that the experimental starch provided reduced melt-away and increased mouth-coating which imparted a creamier pudding texture.

Viscosity and sensory data was collected on the pudding as described in the Examples. The viscosity and sensory data is summarized as follows.

| Experimental Results - Pudding | | |
|---|---|---|
| Attribute | Experimental | Control |
| Viscosity [Pa · s] | 7.36 | 7.27 |
| Spoon Indentation | 5.14 | 5.79 |
| Surface Grain (before stir) | 0.66 | 0.77 |
| Jiggle | 3.5 | 4.10 |
| Surface Grain on spoon | 0.83 | 1.17 |
| Firmness before stir | 5.42 | 4.71 |
| Viscosity off spoon | 3.5 | 2.51 |
| Firmness(after stir) | 5.31 | 4.27 |
| Cohesiveness | 5.83 | 5.38 |
| Evenness of Mouth-coating | 7.12 | 7.63 |
| Slipperiness | 8.84 | 7.91 |
| Melt-away | 8.57 | 10.37 |
| Residual Mouth-coating | 7.38 | 6.21 |

EXAMPLE 5

Evaluation of Low Swelling Starch in Aqueous Dispersions

This example illustrates the behavior of low swelling starches in aqueous dispersions. Preparation of the low swelling starches is described in the Examples.

Preparation of Aqueous Dispersions:

A range of starches with varying swelling volume were selected and there viscosity and sensory properties were evaluated. The starches were prepared as aqueous dispersions at the concentrations shown in the table below.

| Use levels of individual samples | | | |
|---|---|---|---|
| Starch | Swelling volume (ml/g) | Starch (%) | Water (%) |
| E399:38-1 waxy rice | 22 | 5 | 95 |
| E399:38-1 waxy rice | 22 | 10 | 90 |
| E399:38-4 waxy rice | 9 | 5 | 95 |
| E399:38-4 waxy rice | 9 | 10 | 90 |
| E399:38-4 waxy rice | 9 | 15 | 85 |
| E399:41-1 waxy rice | 7 | 5 | 95 |
| E399:41-1 waxy rice | 7 | 10 | 90 |
| E399:41-1 waxy rice | 7 | 15 | 85 |
| E399:41-2 waxy rice | 4 | 5 | 95 |
| E399:41-2 waxy rice | 4 | 10 | 90 |
| E399:41-2 waxy rice | 4 | 15 | 85 |
| E399:41-2 waxy rice | 4 | 20 | 80 |
| E399:48-1 SU2 | 14.7 | 5 | 95 |
| E399:48-1 SU2 starch | 14.7 | 10 | 90 |
| E399:53 SU2 starch | 8.5 | 5 | 95 |
| E399:53 SU2 starch | 8.5 | 10 | 90 |
| E399:53 SU2 starch | 8.5 | 15 | 85 |
| E399:48-3 SU2 starch | 5 | 5 | 95 |
| E399:48-3 SU2 starch | 5 | 10 | 90 |
| E399:48-3 SU2 starch | 5 | 15 | 85 |
| E399:48-3 SU2 starch | 5 | 20 | 80 |
| PURITY ® 87 starch | 14.2 | 5 | 95 |
| PURITY ® 87 starch | 14.2 | 10 | 90 |
| THERMTEX ® starch | 22.8 | 5 | 95 |
| THERMTEX ® starch | 22.8 | 10 | 90 |
| NOVELOSE ® 480 HA starch | 4 | 5 | 95 |
| NOVELOSE ® 480 HA starch | 4 | 10 | 90 |
| NOVELOSE ® 480 HA starch | 4 | 15 | 85 |
| NOVELOSE ® 480 HA starch | 4 | 20 | 80 |
| NOVELOSE ® 480 HA starch | 4 | 30 | 70 |

All samples were prepared using a lab scale Thermomix. Using a clean whisk, dry ingredients were added and whisked into a pre-weighed amount of natural spring water in a clean plastic beaker. The total batch weight was 1500 gram. Mixing was thorough to eliminate lumping. The mix was transferred into a pre-cleaned and sanitized Thermomix kettle. The Thermomix was set to speed 1 and temperature to 93° C. (200° F.). The samples were cooked for a total of 45 minutes (for a 1500 gram batch). Temperature was checked over time using a digital thermometer.

After cooking, the solution was poured into a pre-sanitizead 2000 ml stainless steel beaker, then covered with aluminum foil and let cool for about 10 minutes. Then the solution was poured in 4 oz plastic Jars for sensory and viscosity measurements and placed into the refrigerator for 8 hours. Prior to characterization, samples were taken out from the refrigerator and brought to room temperature (72° F., 22° C.).

Experimental Results:

Swelling volume, viscosity and sensory data was collected on the aqueous dispersions as described in the Examples. The viscosity and sensory data Is summarized as follows.

Swelling volume, Powdery-ness and Residual Mouth-coating

| Starch Name | Starch (%) | Swelling volume (ml/g) | Viscosity at 10 s−1 (Pas) | Powdery-ness | Residual Mouth-Coating |
|---|---|---|---|---|---|
| E399:38-1 | 5 | 22 | 0.940 | 1.9 | 3.57 |
| E399:38-1 | 10 | 22 | 25.25 | 2.24 | 5.71 |
| E399:38-4 | 5 | 9 | 0.003 | 3.47 | 3.57 |
| E399:38-4 | 10 | 9 | 0.111 | 6.59 | 5.95 |
| E399:38-4 | 15 | 9 | 44.48 | 1.25 | 12.34 |
| E399:41-1 | 5 | 7 | 0.002 | 4.14 | 3.6 |
| E399:41-1 | 10 | 7 | 0.018 | 3.8 | 4.5 |
| E399:41-1 | 15 | 7 | 5.547 | 4.45 | 9.17 |
| E399:41-2 | 5 | 4 | 0.001 | 4.57 | 5.2 |
| E399:41-2 | 10 | 4 | 0.003 | 4.73 | 4.32 |
| E399:41-2 | 15 | 4 | 0.012 | 6.24 | 6.07 |
| E399:41-2 | 20 | 4 | 0.909 | 6.52 | 7.51 |
| E399:48-1 | 5 | 14.7 | 0.009 | 5.66 | 4.88 |
| E399:48-1 | 10 | 14.7 | 12.94 | 2.85 | 7.62 |
| E399:53 | 5 | 8.5 | 0.001 | 6.13 | 4.75 |
| E399:53 | 10 | 8.5 | 0.025 | 5.99 | 5.25 |
| E399:53 | 15 | 8.5 | 29.860 | 3.25 | 8.69 |
| E399:48-3 | 5 | 5 | 0.001 | 4.73 | 4.76 |
| E399:48-3 | 10 | 5 | 0.001 | 8.11 | 7.18 |
| E399:48-3 | 15 | 5 | 0.018 | 7.63 | 6.35 |
| E399:48-3 | 20 | 5 | 1.51 | 7.15 | 7.62 |
| PURITY® 87 Starch | 5 | 14.2 | 0.002 | 4.9 | 3.98 |
| PURITY® 87 Starch | 10 | 14.2 | 1.135 | 4.68 | 6.34 |
| THERMTEX® Starch | 5 | 22.8 | 0.796 | 3.97 | 3.59 |
| THERMTEX® Starch | 10 | 22.8 | 12.9 | 1.58 | 7.97 |
| NOVELOSE® 480 HA starch | 5 | 4 | 0.001 | 7.62 | 6.74 |
| NOVELOSE® 480 HA starch | 10 | 4 | 0.001 | 9.54 | 9.22 |
| NOVELOSE® 480 HA starch | 15 | 4 | 0.002 | 10.16 | 10.09 |
| NOVELOSE® 480 HA starch | 20 | 4 | 0.003 | 10.96 | 10.48 |
| NOVELOSE® 480 HA starch | 30 | 4 | 0.019 | 13.27 | 12.24 |

Data Analysis:

Since foods are typically formulated to a specific viscosity. It is necessary to compare the sensory results for different starches at the same viscosity level. For each of the materials in this study we determined the concentration at which the viscosity was equal to 1 Pa·s (+/+0.2 Pa·s), a typical soup viscosity, through visual Interpolation of the data as illustrated in FIG. 1.

We then use the same visual nterpolation to estimate the powdery-ness and mouth-coating at that concentration for each material in the study. The results are collected in the table below.

Starch %, powdery-ness and mouth-coating at viscosity = 1 Pa·s (±0.2 Pa·s)

| Starch Name | Starch % | Swelling Volume (mlg/g) | Viscosity at 10 s$^{-1}$ (Pa·s) | Powdery-ness | Residual Mouth-coating |
|---|---|---|---|---|---|
| E399:41-2 | 20 | 4 | 0.91 | 6.52 | 7.51 |
| E399:48-3 | 19 | 5 | ~1 | 7.2 | 7.5 |
| E399:41-1 | 13.5 | 7 | ~1 | 4.3 | 7.8 |
| E399:53 | 12.5 | 8.5 | ~1 | 4.8 | 7 |
| E399:38-4 | 11.5 | 9 | ~1 | 4.85 | 8.4 |
| PURITY® 87 Starch | 10 | 14.2 | 1.14 | 4.68 | 6.34 |
| E399:48-1 | 8 | 14.7 | ~1 | 3.9 | 6.8 |
| THERMTEX® starch | 5 | 22.8 | 0.80 | 3.97 | 3.59 |
| E399:38-1 | 5 | 22 | 0.94 | 1.9 | 3.57 |

Figure 2:
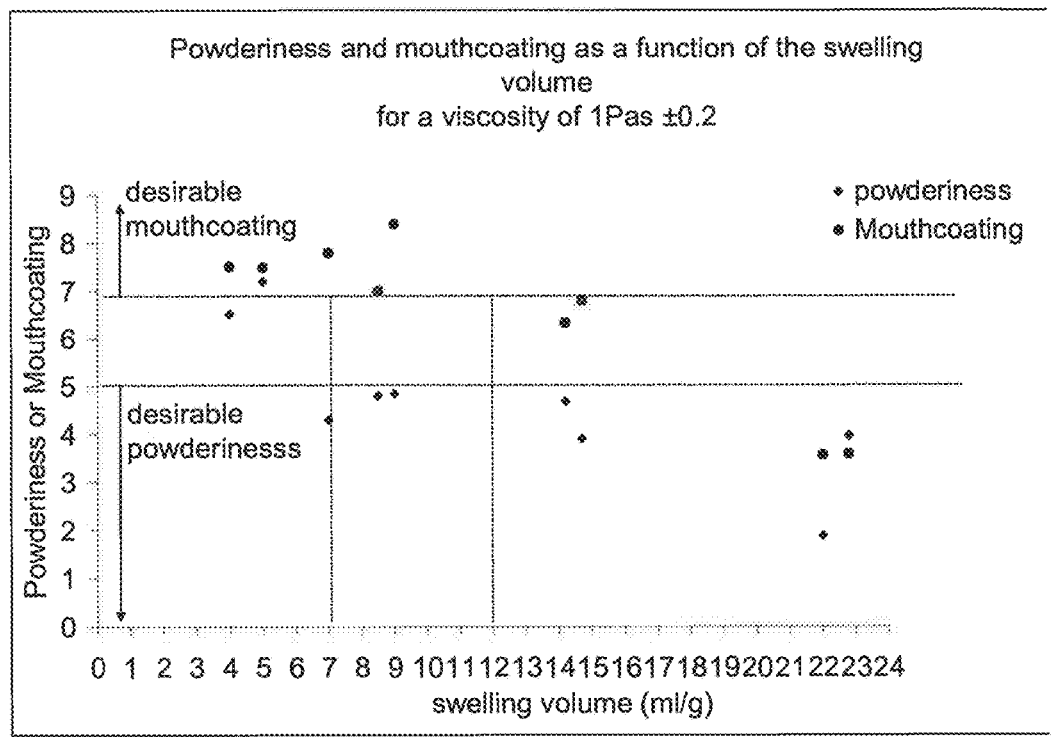
FIG. 2 depicts the powdery-ness and mouth-coating of different swelling volumes at a viscosity of 1 Pa·s

From the table above it can be seen that the very low swelling starches with Q<7 ml/g have a higher powdery-ness which Is undesirable. Additionally, it can be seen that high swelling starches with Q>12 ml/g have a low mouth-coating. The starches of the current Invention are in the range of Q≥7 ml/g and Q≤12 ml/g. In this range the residual mouth-coating remains higher above a Q of 7 while the powdery-ness remains lower at a Q lower than 5. As a result, the low swelling starches of the invention impart a creamier texture. This Is shown graphically on FIG. 2.

EXAMPLE 6

Reduced Processing Times with Low Swelling Starch

This example describes the use of low swelling starches in cream-of-mushroom soups to reduce retort times.

Preparation of Cream-of-Mushroom Soups:

Soups were prepared as described in the example on retorted cream-of-mushroom soups above. The same ingredients and Starch A (National™ 465 starch) and Starch B (waxy rice starch modified with STMP/STPP) were used. Experiments were designed using Design Expert 7.0 (Stat-Ease Inc. Minneapolis, Minn.). A binary mixture design with nine cream-of-mushroom soups containing different ratios of Starch A and Starch B was created. Water was adjusted in the formula to offset starch use levels with the quantity of all other ingredients being kept the same as in the prior example for retorted cream-of-mushroom soup. The compositions of the soups are shown n the table below with Starch A being the control starch and Starch B being the experimental low swelling starch.

| Cream-of-Mushroom Soup Formulations - Retort | | | |
|---|---|---|---|
| Number | Control Starch A % | Experimental Starch B % | Water % |
| 1 | 0.00 | 0.00 | 83.11 |
| 2 | 0.00 | 5.00 | 78.11 |
| 3 | 0.00 | 10.00 | 73.11 |
| 4 | 2.22 | 7.78 | 73.11 |
| 5 | 3.34 | 4.96 | 74.81 |
| 6 | 3.50 | 0.00 | 79.61 |
| 7 | 3.50 | 10.00 | 69.61 |
| 8 | 7.00 | 0.00 | 76.11 |
| 9 | 7.00 | 0.00 | 76.11 |

Experimental Results:

Viscosity and retort time data were collected on the cream-of-mushroom soups as described in the retorted cream-of-mushroom soup example. The viscosity and retort time data is summarized as follows.

| Viscosity and retort time of retorted cream-of-mushroom soups | | | |
|---|---|---|---|
| Number | Starch A (control) % | Starch B (experimental) % | Viscosity [Pa · s] | Retort Time [min] |
| 1 | 0.00 | 0.00 | 0.030 | 10.86 |
| 2 | 0.00 | 5.00 | 0.041 | 11.92 |
| 3 | 0.00 | 10.00 | 0.440 | 22.41 |
| 4 | 2.22 | 7.78 | 5.730 | 19.32 |
| 5 | 3.34 | 4.96 | 6.940 | 15.09 |
| 6 | 3.50 | 0.00 | 1.015 | 16.25 |
| 7 | 3.50 | 10.00 | 10.210 | 54.37 |
| 8 | 7.00 | 0.00 | 9.650 | 18.88 |
| 9 | 7.00 | 0.00 | 10.600 | 20.76 |

Figure 3:
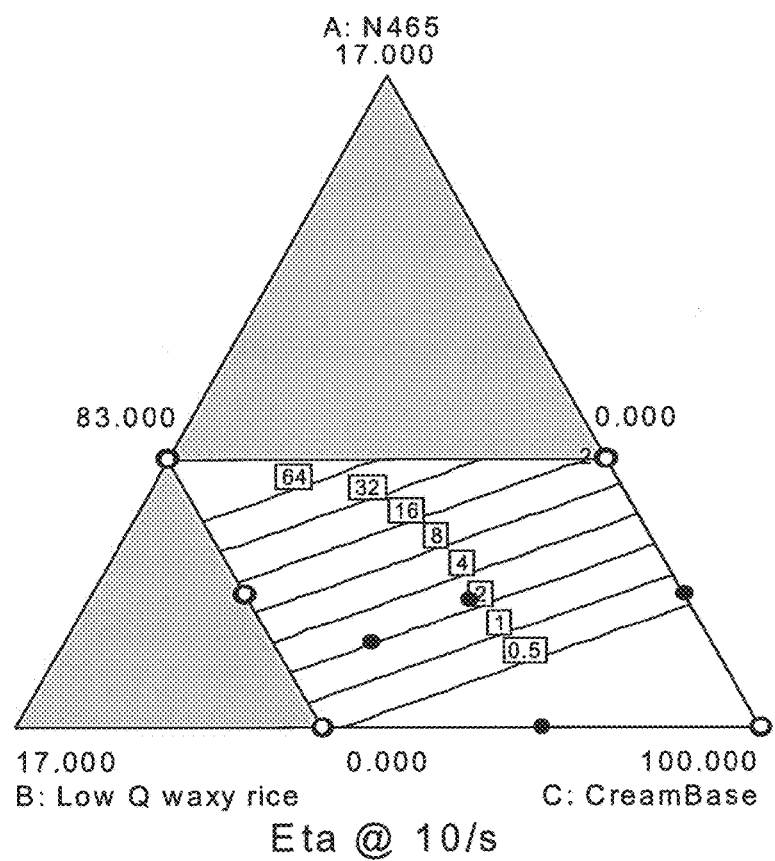
FIG. 3 depicts contour plots of viscosity as a function of Starch A and Starch B levels.

Data Analysis:

The data was entered into Design Expert 7.0 and fit using the software recommended fits. For the viscosity data, a log 10 transform was used and the viscosity data was fit with a linear model. From the viscosity data model, contour plots of viscosity as a function of Starch A and Starch B levels was generated as shown in FIG. 3.

Viscosity model for retort processed cream of mushroom soup

Figure 4:
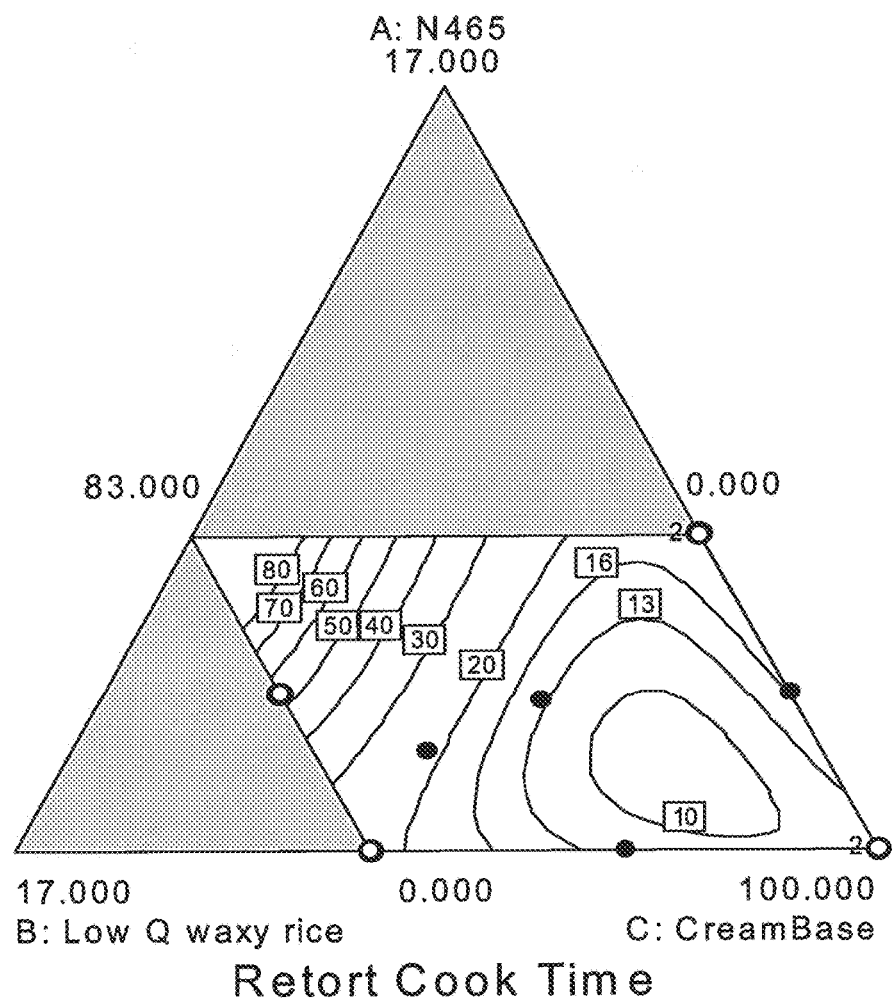
FIG. 4 depicts contour plots of retort time as a function of Starch A and Starch B levels.

Similarly, the retort time data was fit using the Design Expert 7.0 recommended fits. For the retort time data, no transform was used and the data was fit with a special cubic model. From the retort time data model, contour plots of retort time as a function of Starch A and Starch B levels was generated as shown in FIG. 4.

Retort Cook Time Model for Retort Processed Cream Soup

The models for retort time and viscosity were inspected and shown to represent the experimental data points well. They were therefore used to predict the expected minimum retort time at a series of target viscosity values.

The Design Expert 7.0 numerical optimization module was used for the predictions. The target viscosity values were input to the module and the retort time was set to 'minimize'. The viscosity target was weighted as an importance of 5 crosses and the retort time minimization was weighted as an importance of 3 crosses in the settings. In a second step, the module was used to predict the retort time of the control starch if it were used alone to achieve the target viscosity. The module projected the following compositions to deliver minimum retort times.

| Retort time data for low swelling blends and control starch A alone | | | | |
|---|---|---|---|---|
| Target Viscosity [Pa · s] | Starch A [%] | Starch B [%] | Retort Time Minimum of the Low Swelling Starch Blend [min] | Retort Time and Use Level of Starch A at target viscosity [min/%] |
| 0.5 | 1.9 | 4.1 | 9.1 | 16 at 3.2% |
| 1.0 | 3.0 | 3.1 | 9.2 | 17 at 4.0% |
| 2.0 | 3.7 | 3.4 | 10.5 | 18 at 4.8% |
| 4.0 | 4.7 | 2.7 | 12.2 | 19 at 5.6% |
| 8.0 | 5.6 | 2.3 | 14.3 | 19 at 6.4% |
| 14.0 | 6.4 | 1.8 | 16.0 | 20 at 7.0% |
| 32.0 | 7.0 | 2.8 | 21.0 | NA |

Based on the results in the table above, it is apparent that formulations of cream-of-mushroom soup which contain the experimental low swelling starch (Starch B), have shorter retort times than those formulations based on the control starch (Starch A) alone. This Is a desirable feature of the low swelling starch as it allows for faster processing times.

EXAMPLE 7

Evaluation of Low Swelling Starch in Sour Cream

The formulation used for sour cream is shown in the table below.

| Sour Cream Formulation | | |
|---|---|---|
| Ingredients | LIGHT SOUR CREAM EXPERIMENTAL Use Level Wt % | FULL FAT SOUR CREAM CONTROL Use Level Wt % |
| Skim Milk | 68.66 | 49.46 |
| Heavy Cream | 24.00 | 45.00 |
| NFDM low heat | 4.50 | 2.54 |
| Starch A | 1.42 | 3.00 |
| Starch B | 1.42 | 0.00 |
| Total | 100.00 | 100.00 |

Starch A: THERMTEX ® starch
Starch B: Low Swelling Starch - waxy corn starch modified with STMP/STPP with a swelling volume of 8.0 ml/g
Non-fat dry milk solids low heat: Non Fat Dry Milk Solids commercially available from - Dairy America, Grade A Low Heat The dry ingredients Starch A, Starch B and Non Fat Dry Milk were blended well. The blended dry ingredients were added to skim milk under medium agitation (500 rpm) n a liquefier and made into a slurry by mixing for 5 minutes. Heavy cream was added and blended for 30 seconds and collected immediately to avoid creating foam. Microthermics model HVHW pilot scale HTST pasteurizer was used to process the mix. The mix was processed at 185° F. (85° C.) with a holding time of 5 minutes and homogenized in line, upstream with 2500 psi (17237 kPa) at 1st stage and 500 psi (3447 kPa) at 2nd stage. The mix was cooled to 72° F. (22° C.), Inoculated with Culture DVS-DVG-2000-10 (Chr. Hansen) at the rate of 0.02% and mixed well to disperse the culture. The mixture was incubated at 72° F. (22° C.) to pH 4.5. The set curd was broken and pumped through a homogenizing valve at 30 psi (207 kPa) and packaged in containers and refrigerated at 40° F.

When the experimental sample was compared to the control we observed that many of the sensory attributes were similar. The experimental sample performed slightly better in some key fat mimetic attributes such as meltaway, slipperiness and dairy mouthcoating.

This enabled us to create a creamier light (9% butter fat) sour cream, comparable to a full fat (18% butter fat) sour cream.

Viscosity and sensory data was collected on the sour cream as described in the Examples. The viscosity and sensory data is summarized as follows.

| Experimental Results - Sour cream sensory attributes and ratings | | |
|---|---|---|
| Attribute Title | Experimental | Control |
| Surface Shine in Container | 9.90 | 8.76 |
| Spoon Indentation | 8.11 | 9.41 |
| Jiggle | 1.46 | 1.60 |
| Surface Grain on spoon | 4.05 | 4.55 |
| Firmness (Before Stir) | 6.46 | 7.80 |
| Thickness in the mouth (before stir) | 9.60 | 12.00 |
| Cohesiveness | 6.61 | 8.15 |
| Viscosity (stir) | 7.87 | 10.37 |
| Slipperiness | 9.65 | 9.02 |
| Meltaway | 7.23 | 6.07 |
| Total Residual Mouth coating | 6.13 | 7.45 |
| Chalky mouth coating | 2.60 | 2.20 |
| Dairy mouth coating | 3.54 | 3.91 |

EXAMPLE 8

Enhanced Process Tolerance of Low Swelling Starch

This example illustrates the enhanced process resistance of the low swelling volume starches. The measured swelling volume for each starch after cooking and its variation from the reference swelling volume can be considered as an indicator of the starch sensitivity to the cooking process conditions.

Definitions of measured and reference swelling volumes are given below.

The "measured swelling volume" is the swelling volume as measured in section B with the sample preparation process outlined in section "Preparation of Aqueous Dispersions". The actual cooking protocol is constant but for a given starch the process conditions specifically concentration, resulting viscosity and hence stress on the cook are at a variable severity.

The "reference swelling volume" is the swelling volume as measured in section B including the sample preparation steps. The process conditions for a given starch including actual cooking protocol are constant for all samples when made by the process relevant to Q reference.

Figure 5:
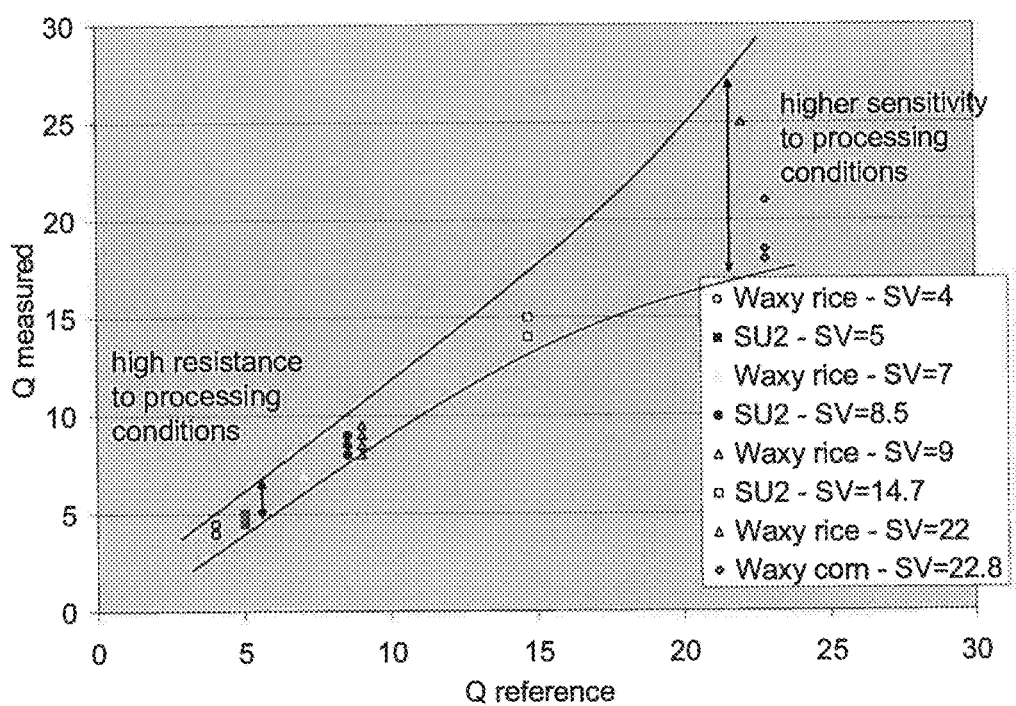
FIG. 5 depicts the variation of swelling volume under a range of conditions; including high and low solids formulation, high and low shear processing.

Data for low swelling volume starches show that the measured swelling volumes remain very tight as the concentration and the viscosity change. As we can see on FIG. 5, low swelling starches are insensitive to changes in processing due to concentration, and viscosity. However, for higher swelling volume starches (reference swelling volume Q>15 ml/g) as the concentration and viscosity (hence process conditions) change, larger variations in the measured swelling volumes can be observed. Therefore, we can conclude that low swelling volume starches will show a more consistent final product quality due to their enhanced process stability under the conditions studied.

EXAMPLE 9

Preparation of Crosslinked Starches

In another embodiment the starch is stabilized by reaction with propylene oxide and then cross-linked with phosphorus oxychloride (POCl3) to result in starches with claimed swelling volumes.

The stabilization with propylene oxide is carried out by adding a total of 1000 parts tapioca starch to a reaction vessel containing a solution of 180 parts sodium sulfate in 1250 parts water. To this solution, 1.3 parts of sodium hydroxide (added as a 3% solution) was added to provide an alkalinity of 64 mL (mL 0.1 N HCl required to neutralize 50 mL of slurry), followed by 48 parts of propylene oxide. This was added to a plastic bottle which was sealed and allowed to react at 40° C. while being continuously tumbled to assure uniform suspension of the starch throughout the mixture. After 16 hours the temperature was reduced to 30° C. POCl$_3$ was then added at a 0.040% level on starch weight and allowed to react for 30 minutes. The pH of the resultant suspension was then adjusted to 3.0-3.5 with 25% sulfuric acid solution, held for 1 hour and then adjusted to pH 5.5 by the addition of 3% NaOH. The hydroxypropylated/cross-linked starch was then recovered by filtration, washed with 1000 parts water, and dried. The swelling volume of this sample was determined to be 9 mL/g.

What is claimed is:

1. A method comprising:
   retorting a first food composition for a first retort time, wherein the first food composition comprises a starch having a swelling volume of greater than 7 and less than 11 and a fraction of soluble starch that is less than 20% wt/wt and wherein the retort time is at least 20% less than a second retort time for retorting a second food composition having an identical composition as the first food composition except at least 25% by weight of the starch is replaced with a retort starch wherein the swelling volume is measured as follows:
   a) preparing a 5% starch slurry in 1% NaCl solution in a beaker;
   b) heating the slurry in the beaker using a boiling water bath having a minimum temperature of 95° C. for 20 minutes, stirring for the first 3 minutes and then cover with a watch glass for the remaining time;
   c) diluting the slurry to 1% and allowing to settle for 24 hours and optionally, waiting a total of 72 if the low swelling starch is a waxy rice starch to form a dilute settled slurry; and
   d) extracting an aliquot of supernatant of the dilute settled slurry; and
   e) using a refractometer or polarimeter to measure the concentration of starch in the supernatant; and
   f) calculating the percent of swelling starch that is soluble.

2. The method of claim 1, wherein the first retort time is at least 25% less than the second retort time.

3. The method of claim 2, wherein the first retort time is at least 30% less than the second retort time.

4. The method of claim 1, wherein the starch has a swelling volume from to 9 to 10 ml/g.

* * * * *